United States Patent
Xu et al.

(10) Patent No.: US 10,773,377 B2
(45) Date of Patent: Sep. 15, 2020

(54) ROBOT STRUCTURE

(71) Applicant: YUTOU TECHNOLOGY (HANGZHOU) CO., LTD., Zhejiang (CN)

(72) Inventors: Jian Xu, Zhejiang (CN); Gangying Du, Zhejiang (CN); Chengkan Lv, Zhejiang (CN); Yi Chen, Zhejiang (CN); Da Wei, Zhejiang (CN)

(73) Assignee: YUTOU TECHNOLOGY (HANGZHOU) CO., LTD., Zhejiang (CN)

( * ) Notice: Subject to any disclaimer, the term of this patent is extended or adjusted under 35 U.S.C. 154(b) by 255 days.

(21) Appl. No.: 16/079,955

(22) PCT Filed: Feb. 20, 2017

(86) PCT No.: PCT/CN2017/074072
§ 371 (c)(1),
(2) Date: Aug. 24, 2018

(87) PCT Pub. No.: WO2017/166947
PCT Pub. Date: Oct. 5, 2017

(65) Prior Publication Data
US 2019/0047140 A1    Feb. 14, 2019

(30) Foreign Application Priority Data
Mar. 30, 2016    (CN) .......................... 2016 1 0192616

(51) Int. Cl.
*B25J 9/00*    (2006.01)
*H04R 5/04*    (2006.01)
(Continued)

(52) U.S. Cl.
CPC .......... *B25J 9/0003* (2013.01); *B25J 9/0009* (2013.01); *B25J 9/08* (2013.01); *B25J 11/00* (2013.01);
(Continued)

(58) Field of Classification Search
CPC .......... H04R 1/02; H04R 1/026; H04R 1/028; H04R 1/403; H04R 3/002; H04R 5/02;
(Continued)

(56) References Cited

U.S. PATENT DOCUMENTS 7,215,786 B2 *    5/2007    Nakadai ............... G10L 21/0208
                                                                318/568.12
7,366,309 B2 *    4/2008    Sato ....................... B25J 13/003
                                                                381/110
(Continued)

FOREIGN PATENT DOCUMENTS

CN    104581452    4/2015
CN    204337780    5/2015
(Continued)

OTHER PUBLICATIONS

International Search Report and publication issued for PCT/CN2017/074072 ( WO2017/166947 A1) by the China P. R. State Intellectual Property Office dated May 25, 2017.

*Primary Examiner* — Xu Mei
(74) *Attorney, Agent, or Firm* — Umberg Zipser LLP

(57) ABSTRACT

Disclosed is a robot structure, comprising: a cylindrical body, a hemispherical top portion and a bottom portion; an accommodation chamber provided inside the body; a main board horizontally arranged in the top portion; a pickup module horizontally arranged in the top portion and located above the main board, a connecting wire connects the main board and pickup board; a fixing bracket arranged in the middle of the accommodation chamber and close to one side
(Continued)

of the body; a projection module arranged on the fixing bracket and located below the main board, and connected to the main board through a connecting wire; a pair of speakers arranged in the bottom portion and respectively connected to the main board through a connecting wire; and a power module in the bottom portion below the pair of speakers, and connected to the main board through a connecting wire.

10 Claims, 2 Drawing Sheets

(51) Int. Cl.
*H04R 1/02* (2006.01)
*B25J 11/00* (2006.01)
*B25J 9/08* (2006.01)
*H04R 1/40* (2006.01)
*H04R 5/02* (2006.01)
*H04R 3/00* (2006.01)

(52) U.S. Cl.
CPC ............... *H04R 1/028* (2013.01); *H04R 5/04* (2013.01); *H04R 1/406* (2013.01); *H04R 3/005* (2013.01); *H04R 5/02* (2013.01); *H04R 2201/029* (2013.01)

(58) Field of Classification Search
CPC ........ H04R 2205/021; H04R 2205/025; H04R 2420/07; H04R 2499/10; H04R 2499/11; B25J 9/0003; B25J 9/0009; B25J 9/08; B25J 11/00; B25J 13/00; B25J 13/003; B25J 19/02; B25J 19/026; B25J 19/04
USPC ......... 381/87, 332, 333, 334, 336, 386, 388, 381/395; 901/1, 46, 50
See application file for complete search history.

(56) References Cited

U.S. PATENT DOCUMENTS

| | | | | |
|---|---|---|---|---|
| 9,977,469 | B2* | 5/2018 | Christfort | G06F 1/1635 |
| 9,992,036 | B2* | 6/2018 | Eom | G06F 1/1637 |
| 10,166,681 | B2* | 1/2019 | Xiong | H04R 1/028 |
| 10,516,862 | B2* | 12/2019 | Du | H04N 9/3141 |
| 2012/0320077 | A1* | 12/2012 | Larsen | B25J 11/001 |
| | | | | 345/589 |
| 2018/0188347 | A1* | 7/2018 | Gao | H04R 1/406 |
| 2020/0215695 | A1* | 7/2020 | Cristache | B25J 9/161 |

FOREIGN PATENT DOCUMENTS

| | | |
|---|---|---|
| CN | 104683841 | 6/2015 |
| CN | 204910761 | 12/2015 |
| CN | 205438586 | 8/2016 |
| KR | 20100095484 | 8/2010 |
| WO | 2014/162162 A1 | 10/2014 |

* cited by examiner

ROBOT STRUCTURE

CROSS-REFERENCE TO RELATED APPLICATIONS

The present application claims priority to and the benefit of Chinese Patent Application No. CN 201610192616.2 filed on Mar. 30, 2016, the entire content of which is incorporated herein by reference.

BACKGROUND OF THE INVENTION

1. Field of the Invention

The present invention relates to a technical field of the robot, especially to a robot structure.

2. Description of the Related Art

With the continuous development of electronic technique, an increasing number of intelligent robots become a part of our lives, thereby providing users with convenient and comfortable lives. With continuous enrichment of functions of intelligent robots, intelligent robots can offer various services, such as playing music for users, and can interact well with users. However, intelligent robots in the prior art not only have complicated inner structure but also have a large size so that it is inevitable to occupy too much space during placing.

SUMMARY OF THE INVENTION

Aiming at the abovementioned technical problems of intelligent robots in the prior art, the invention provides a robot structure, which is intended to simplify structure and have a small size for occupying less space.

The technical solution specifically comprises:

A robot structure, wherein it comprises:

a body having a cylinder shape, a hemispherical top portion and a bottom portion;

a cavity arranged within the body;

a mainboard, horizontally disposed within the top portion;

a sound pick-up module, horizontally disposed above the mainboard within the top portion, wherein the sound pick-up module is connected to the mainboard through a connecting wire;

a supporting structure, disposed within middle of the cavity, adjacent to one side of the body;

a projection module, disposed on the supporting structure and located below the mainboard, wherein the projection module is connected to the mainboard through a connecting wire;

a pair of loudspeakers, arranged within the bottom portion, wherein the pair of loudspeakers is connected to the mainboard through two connecting wires respectively;

a power module, arranged within the bottom portion and located below the pair of loudspeakers, wherein the power module is connected to the mainboard through a connecting wire; the power module is used to connect an electric supply for providing the mainboard with operating current.

Preferably, a distance between the sound pick-up module and the pair of loudspeakers is greater than 20 cm.

Preferably, the sound pick-up module comprises a circular base plate and a microphone array consisting of at least 8 microphones arranged on the circumference of one side of the circular base plate.

Preferably, one microphone is arranged at the center of the circular base plate.

Preferably, the robot structure further comprises a display screen, which is disposed on a surface of the body and on a side away from the projection module, is configured to display images projected by the projection module on the external surface of the body.

Preferably, a sensor module is disposed on a shell of the body.

Preferably, the sensor module includes a temperature sensor, a light sensor, or a touch sensor.

Preferably, a shell of the body is made from polycarbonate or polymethyl methacrylate.

Preferably, the bottom portion is made of aluminum.

Preferably, the pair of loudspeakers is disposed back to back within the bottom portion, wherein a line connecting two centers of the pair of loudspeakers is parallel to or perpendicular to a projection direction of the projection module.

The advantageous effects of the invention includes: the robot structure not only has a simple structure but also has a small size, thereby occupying much less space; the technical solution overcomes the defects of complicated structure and occupying too much space during placing, of intelligent robots in the prior art.

BRIEF DESCRIPTIONS OF THE DRAWINGS

The accompanying drawings, together with the specification, illustrate exemplary embodiments of the present disclosure, and, together with the description, serve to explain the principles of the present invention.

REFERENCE NUMBERS

Figure 1:
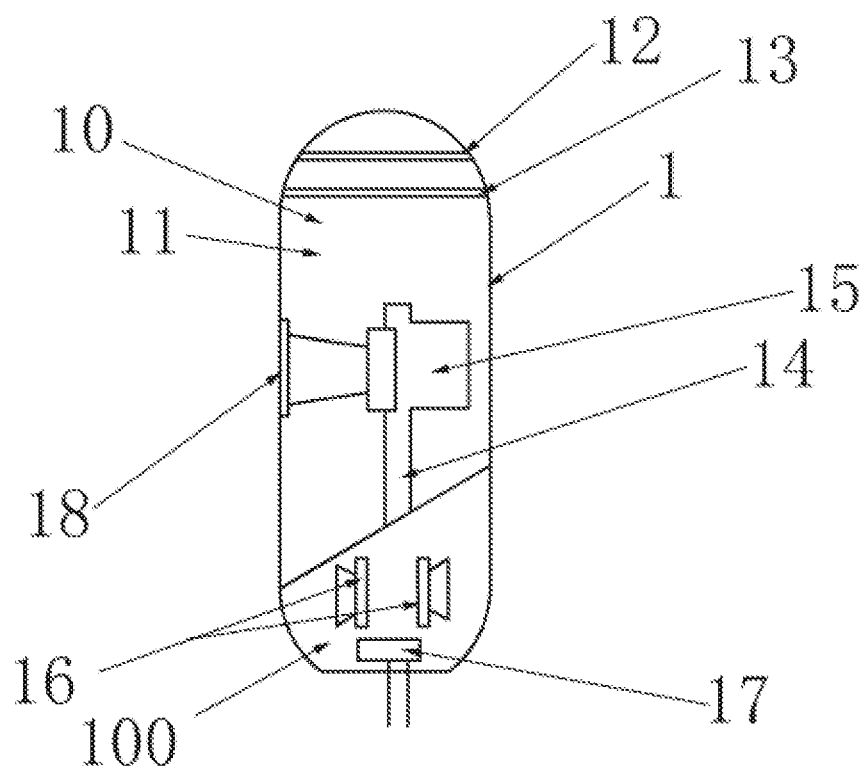
FIG. 1 is a structure diagram of a robot structure according to a preferred embodiment of the invention.

1—body, 10—top portion, 100—bottom portion, 11—cavity, 12—sound pick-up module, 13—mainboard, 14—supporting structure, 15—projection module, 16—loudspeaker, 17—power module, 18—display screen, 121—microphone.

DETAILED DESCRIPTIONS

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one. Hereinafter, certain exemplary embodiments according to the present disclosure will be described with reference to the accompanying drawings.

The present invention comprises a robot structure.

As shown in FIG. 1, in a preferred embodiment, a robot structure comprises:

a body 1 having a cylinder shape, a hemispherical top portion 10 and a bottom portion 100;

a mainboard 13, horizontally disposed within the top portion 10;

a sound pick-up module 12, horizontally disposed above the mainboard 13 within the top portion 10, wherein the sound pick-up module 12 is connected to the mainboard 13 through a connecting wire;

a supporting structure 14, disposed within middle of the cavity 11, adjacent to one side of the body 1;

a projection module 15, disposed on the supporting structure 14 and located below the mainboard 13, wherein the projection module 15 is connected 13 to the mainboard through a connecting wire;

a pair of loudspeakers 16, arranged opposite to each other within the bottom portion 100, wherein the pair of loudspeakers 16 is connected to the mainboard 13 through two connecting wires respectively;

a power module 17, arranged within the bottom portion 100 and located below the pair of loudspeakers 16, wherein the power module 17 is connected to the mainboard 13 through a connecting wire; the power module 17 is used to connect an electric supply for providing the mainboard 13 with operating current.

In the technical solution, the configuration of sound pick-up module 12 in the top portion 10, the configuration of projection module 15 in middle of the cavity 11, and the configuration of the pair of loudspeakers 16 and the power module 17 in the bottom portion 100 achieves mutual cooperation of these function modules, which could implement voice interaction, display information and other basic functions of a robot; these function modules have simple structure, and decrease interference from various modules.

In a preferred embodiment, a distance between the sound pick-up module 12 and the pair of loudspeakers 16 is greater than 20 cm.

In the technical solution, greater than 20 cm of the distance between the sound pick-up module 12 and the pair of loudspeakers 16 could effectively reduce interference with the sound pick-up module 12 when the pair of loudspeakers 16 is operating.

Figure 2:
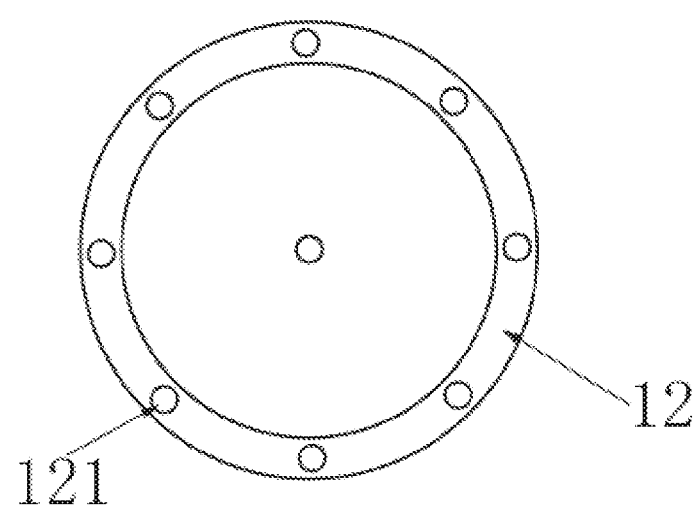
FIG. 2 is a structure diagram of a sound pick-up module in a robot structure according to a preferred embodiment of the invention.

In a preferred embodiment, as shown in FIG. 2, the sound pick-up module comprises a circular base plate and a microphone array consisting of at least 8 microphones 121 arranged on the circumference of one side of the circular base plate. Furthermore, one microphone is arranged at the center of the circular base plate.

In the technical solution, a microphone array consisting of 9 microphones 121 can be used to receive voice information of users from multi directions and denoise the acquired voice information, so as to ensure the accuracy of the acquired voice information of users.

In a preferred embodiment, the robot structure further comprises a display screen 18, which is disposed on an external surface of the body 1 and on a side away from the projection module 15, is configured to display images projected by the projection module 15 on the external surface of the body 1.

In the technical solution, the configuration of the display screen is facilitated for the projection module 15 to make full use of the inner space of the body; displaying images projected on the external surface of the body 1 is useful for a user timely observing images displayed. Additionally, use of rear projection could reduce blue ray damage to eyes of a user effectively.

In the technical solution, because various methods of use of projection modules for projecting images are known to a person skilled in the art, it is not necessary to give details herein.

In a preferred embodiment, a sensor module is disposed on a shell of the body 1.

In a preferred embodiment, the sensor module comprises a temperature sensor, a light sensor, and a touch sensor.

In the technical solution, a temperature sensor, a light sensor and a touch sensor are disposed on the shell of the body 1 of the robot, and all of them are connected to corresponding chips in the mainboard 13 through connecting wires, so as to use corresponding sensors to transmit information acquired to corresponding chips for treatment, thereby implementing relative operation.

In a preferred embodiment, the shell of the body 1 is made from poly carbonate.

In the technical solution, polycarbonate possesses good elasticity, so that the outside of the robot can withstand high intensity impact.

In a preferred embodiment, the shell of the body 1 is made from polymethyl methacrylate.

In the technical solution, polymethyl methacrylate possesses good light-admitting quality and excellent ageing resistance, so that the light sensor disposed on the shell could collect light brightness information conveniently, and it is easy for a user to see contents shown in the display screen.

In a preferred embodiment, the bottom portion 100 is made of aluminum.

In the technical solution, the bottom portion made of aluminum is beneficial to have a lighter weight for the whole robot, in order to obtain stable placement, so that it is convenient for a user to put the robot at any place.

In a preferred embodiment, as shown in FIG. 1, the pair of loudspeakers 16 are disposed back to back within the bottom portion 100, wherein a line connecting two centers of the pair of loudspeakers 16 is parallel to a projection direction of the projection module 15.

In the technical solution, it is convenient for a user to hear the sound played by the loudspeakers 16 both from the front and the back of the robot clearly.

Figure 3:
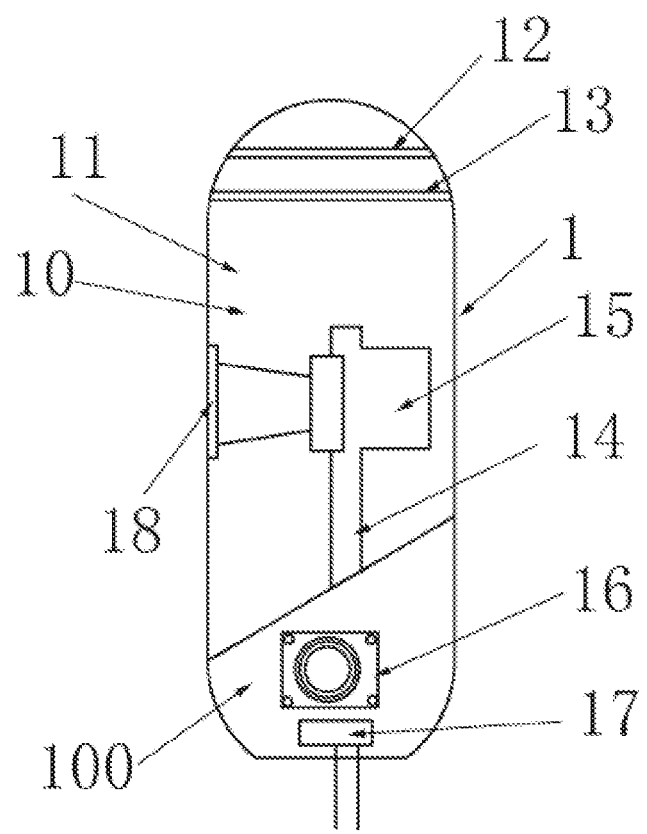
FIG. 3 is a structure diagram of a robot structure according to a preferred embodiment of the invention, showing the location of the loudspeaker.

In a preferred embodiment, as shown in FIG. 3, the pair of loudspeakers 16 is disposed back to back within the bottom portion 100, wherein a line connecting two centers of the pair of loudspeakers 16 is perpendicular to a projection direction of the projection module 15.

In the technical solution, the installation mode of the loudspeakers 16 is much more beneficial to playing stereo.

In a specific embodiment, a user can start the robot through a way of voice control, when he/she wants the robot to be operated. For example, if a user wants the robot to be controlled to play a specific music, the user will issue a voice instruction for playing the specific music to the robot by his/her voice after the robot started, then the voice instruction will be accepted by the sound pick-up module 12 of the robot; the robot will start the function of playing music according to the voice instruction, and will project the name of the song and lyrics thereof corresponding to the music on the display screen by the projection module 15 while playing music, so it is convenient for the user to view the information associated with the song.

These embodiments shown above represent only preferred examples of the present invention and may therefore not be understood to be limiting of the embodiments and scope of the invention. Alternative embodiments that can be contemplated by the person skilled in the art are likewise included in the scope of the present invention.

What is claimed is:

1. A robot structure, comprising:
   a body having a cylinder shape, a hemispherical top portion and a bottom portion;
   a cavity arranged within the body;
   a mainboard, horizontally disposed within the top portion;
   a sound pick-up module, horizontally disposed above the mainboard within the top portion, wherein the sound pick-up module being connected to the mainboard through a connecting wire;
   a supporting structure, disposed within a middle of the cavity, adjacent to one side of the body;
   a projection module, disposed on the supporting structure and located below the mainboard, wherein the projection module being connected to the mainboard through a connecting wire;
   a pair of loudspeakers, arranged within the bottom portion, wherein the pair of loudspeakers being connected to the mainboard through two connecting wires respectively;
   a power module, arranged within the bottom portion and located below the pair of loudspeakers, wherein the power module being connected to the mainboard through a connecting wire; the power module is used to connect an electric supply for providing the mainboard with operating current.

2. The robot structure as claimed in claim 1, wherein a distance between the sound pick-up module and the pair of loudspeakers is greater than 20 cm.

3. The robot structure as claimed in claim 1, wherein the sound pick-up module comprises a circular base plate, and a microphone array consisting of at least 8 microphones is arranged on the circumference of one side of the circular base plate.

4. The robot structure as claimed in claim 3, wherein one microphone is arranged at the center of the circular base plate.

5. The robot structure as claimed in claim 1, wherein further comprises a display screen, which is disposed on a surface of the body and on a side away from the projection module, so as to display images projected by the projection module on the external surface of the body.

6. The robot structure as claimed in claim 1, wherein a sensor module is disposed on a shell of the body.

7. The robot structure as claimed in claim 6, wherein the sensor module comprises a temperature sensor, a light sensor, and a touch sensor.

8. The robot structure as claimed in claim 1, wherein a shell of the body is made from polycarbonate or polymethyl methacrylate.

9. The robot structure as claimed in claim 1, wherein the bottom portion is made of aluminum.

10. The robot structure as claimed in claim 1, wherein the pair of loudspeakers is disposed back to back within the bottom portion, wherein a line connecting two centers of the pair of loudspeakers is parallel to or perpendicular to a projection direction of the projection module.

* * * * *